United States Patent
Cho et al.

(10) Patent No.: US 8,004,295 B2
(45) Date of Patent: Aug. 23, 2011

(54) ELECTRICAL SPECIFIC RESISTIVITY PROBING ROBOT

(75) Inventors: Seong-Jun Cho, Daejeon (KR); Jung-Ho Kim, Daejeon (KR)

(73) Assignee: Korea Institute of Geoscience & Mineral Resources, Daejeon (KP)

( * ) Notice: Subject to any disclaimer, the term of this patent is extended or adjusted under 35 U.S.C. 154(b) by 0 days.

(21) Appl. No.: 12/280,433

(22) PCT Filed: Oct. 11, 2007

(86) PCT No.: PCT/KR2007/004963
§ 371 (c)(1),
(2), (4) Date: Aug. 22, 2008

(87) PCT Pub. No.: WO2009/048190
PCT Pub. Date: Apr. 16, 2009

(65) Prior Publication Data
US 2010/0231247 A1    Sep. 16, 2010

(51) Int. Cl.
*G01R 27/08* (2006.01)
*G01R 31/02* (2006.01)
*G01V 3/00* (2006.01)
(52) U.S. Cl. ......... 324/724; 324/72; 324/72.5; 324/713; 324/347; 901/46
(58) Field of Classification Search .......... 324/724, 324/72, 72.5, 713, 715, 323, 347; 901/46
See application file for complete search history.

(56) References Cited

U.S. PATENT DOCUMENTS

| | | | | |
|---|---|---|---|---|
| 2,105,247 A * | 1/1938 | Jakosky | .................. | 324/363 |
| 5,587,659 A * | 12/1996 | Sorensen | .................. | 324/357 |
| 6,263,989 B1 | 7/2001 | Won | | |
| 7,511,503 B2 * | 3/2009 | Suedekum | .................. | 324/354 |
| 2007/0069733 A1 * | 3/2007 | Suedekum | .................. | 324/347 |

FOREIGN PATENT DOCUMENTS

| | | |
|---|---|---|
| JP | 2007108084 | 4/2007 |
| RU | 2148839 | 5/2000 |
| WO | 94/29752 | 12/1994 |

OTHER PUBLICATIONS

International Search Report for Corresponding PCT Application No. PCT/KR2007/004963, dated Jul. 20, 2009.

* cited by examiner

*Primary Examiner* — Timothy J Dole
(74) *Attorney, Agent, or Firm* — Caesar, Rivise, Bernstein, Cohen & Pokotilow, Ltd.

(57) ABSTRACT

An electrical specific resistivity probing robot is directed to automatically measuring a three-dimensional electrical specific resistivity structure of an underground shallow region by installing a plurality of probing electrodes at regular intervals along a robot-moving caterpillar to measure difference of potentials of the electrodes at a ground plane. The electrical specific resistivity probing robot includes a frame, a driving member installed under the frame, a pair of insulating caterpillars installed to both sides of a lower portion of the frame and driven by the driving member, a plurality of probing electrodes installed along track circumferences of the caterpillars at regular intervals, a slip ring electrically slip-connected to the probing electrodes one by one, and a cable electrically connected to the slip ring.

5 Claims, 2 Drawing Sheets

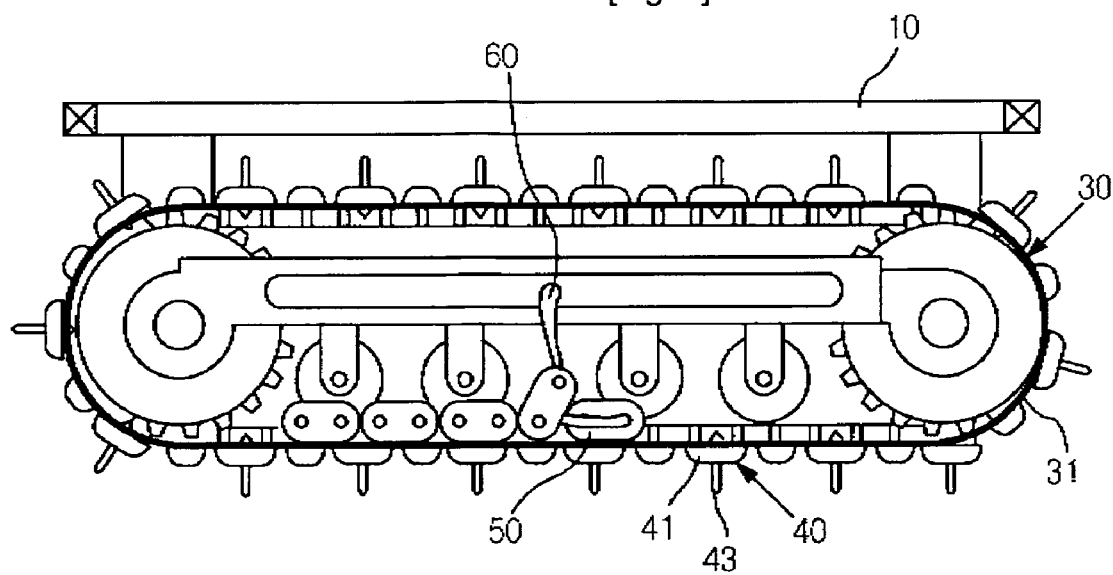
[Fig. 1]
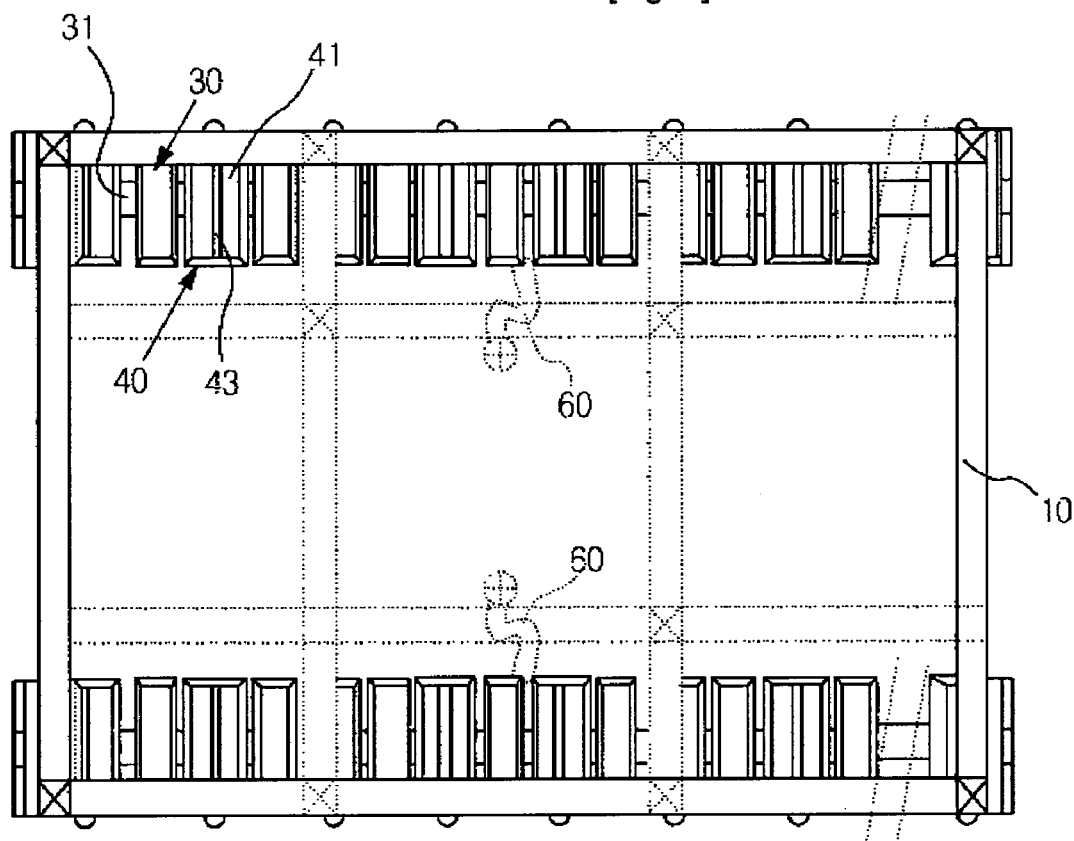
[Fig. 2]

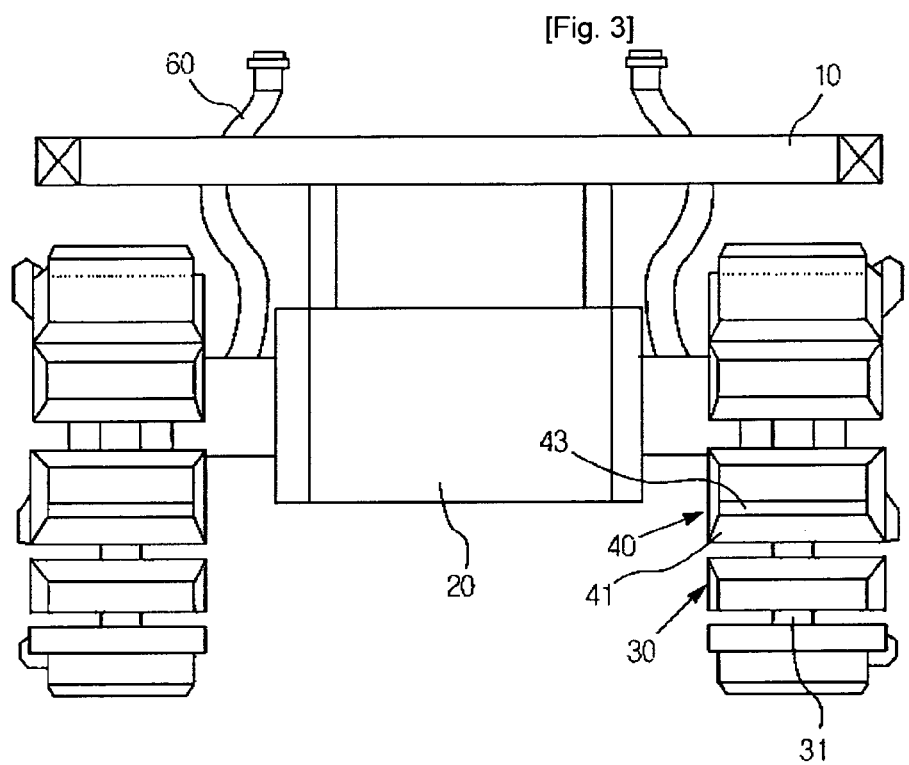
[Fig. 3]
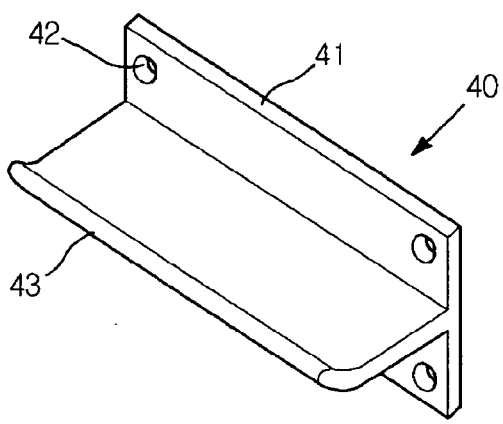
[Fig. 4]
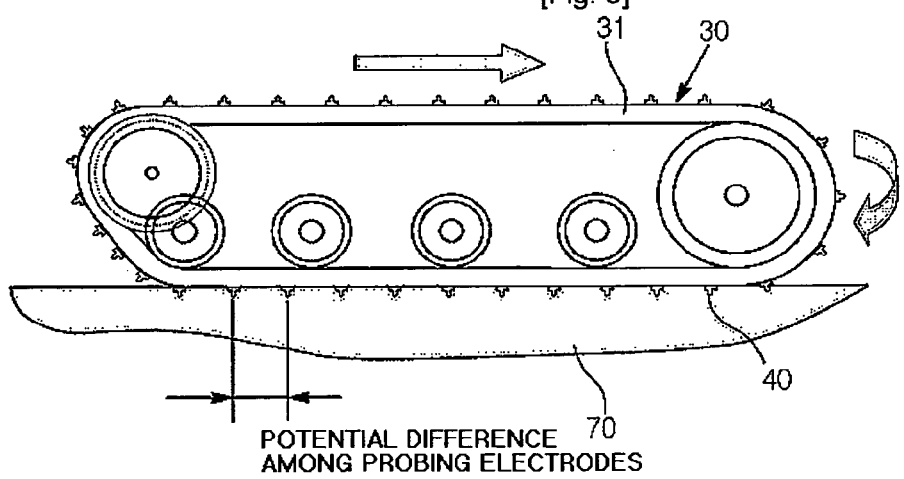
[Fig. 5]

ELECTRICAL SPECIFIC RESISTIVITY PROBING ROBOT

TECHNICAL FIELD

The present invention relates to an electrical specific resistivity probing robot, and more particularly to an electrical specific resistivity probing robot that may automatically measure a three-dimensional electrical specific resistivity structure of an underground shallow region by installing a plurality of probing electrodes at regular intervals along a robot-moving caterpillar to measure difference of potentials of the electrodes at a ground plane.

BACKGROUND ART

Generally, electrical specific resistivity probing is conducted in a way of flowing a constant electric current to a conductor, measuring a potential difference of certain two points, and then calculating resistance between two points. That is to say, in order to image a geologic structure complicated with irregular media, the electrical specific resistivity probing is a geophysical method for artificially passing an electric current under the ground to measure potential differences and then monitor geological structure or anomaly.

This electrical specific resistivity probing is conducted along the ground surface and used for checking a geological structure beneath the ground surface. Also, it is one of most popular physical probing methods.

An electrical specific resistivity of a rock is varied due to the factors such as porosity of the rock, physical properties of pore water, saturation degree of fluid, kind of rock-forming minerals, existence of clay minerals, and a discontinuity dominating secondary pores (e.g., fault and fractured zone). Generally, a ground probing equipment used along the ground surface includes electrodes for transmitting or receiving underground data to/from the ground surface, a multi cable for connecting the ground surface electrodes with measurement equipment, and a measurement system.

As one of such electrical specific resistivity probing techniques, Korean Laid-open Patent Publication No. 2003-42607 discloses a ground probing technique, which is conducted in a way of inserting an electrode rod into an exploratory hole perforated in a ground probing area, and then injecting conductive cohesive solution into the ground around the electrode rod so as to improve conductive contact performance between the electrode rod and the surrounding ground.

However, this electrical specific resistivity probing method needs to perforate an exploratory hole and then install an electrode thereon, which consumes much time, human power and costs, so the conventional method is economically disadvantageous.

DISCLOSURE

Technical Problem

The present invention is designed in consideration of the above problems, and therefore it is an object of the invention to provide an electrical specific resistivity probing robot, which enable to automatically and rapidly measure a three-dimensional electrical specific resistivity structure of an underground shallow region by installing a plurality of probing electrodes at regular intervals along a robot-moving caterpillar to measure difference of potentials of the electrodes at a ground plane.

Technical Solution

In order to accomplish the above object, the present invention provides an electrical specific resistivity probing robot, which includes a frame; a driving means installed under the frame; a pair of insulating caterpillars installed to both sides of a lower portion of the frame and driven by the driving means; a plurality of probing electrodes installed along track circumferences of the caterpillars at regular intervals; a slip ring electrically slip-connected to the probing electrodes one by one; and a cable electrically connected to the slip ring.

According to the present invention, the probing electrodes are preferably installed such that at least 8 electrodes come in contact with a ground surface when the caterpillars contact with the ground surface.

In addition, the electrical specific resistivity probing robot of the present invention may further include a remote control means, and the remote control means receives a remote control signal and controls the driving means according to the received control signal.

In addition, the electrical specific resistivity probing robot of the present invention may further include a measuring means, and the measuring means receives a measurement signal through the cable connected to the slip ring, and measures an electrical specific resistivity structure under the ground according to the received signal.

Advantageous Effects

The electrical specific resistivity probing robot according to the present invention may measure a three-dimensional electrically specific resistivity structure in an automatic and rapid way by applying an electric current under the ground through probing electrodes contacted with the ground surface by a caterpillar while a probing operator remotely controls the probing robot to travel, and then continuously measuring potential differences among the probing electrodes.

Thus, the electrical specific resistivity probing robot of the present invention is more efficient and economic since it may reduce time, human power and costs in comparison to a conventional electrical specific resistivity probing that needs insertion of an electrode rod into the ground.

DESCRIPTION OF DRAWINGS

FIG. 1 is a side view showing an electrical specific resistivity probing robot according to the present invention.

FIG. 2 is a plane view showing the electrical specific resistivity probing robot according to the present invention.

FIG. 3 is a right side view showing the electrical specific resistivity probing robot according to the present invention.

FIG. 4 is a perspective view showing a probing electrode of the electrical specific resistivity probing robot according to the present invention.

FIG. 5 is a schematic diagram illustrating an electrical specific resistivity probing process conducted by the electrical specific resistivity probing robot according to the present invention.

<Reference Numerals of Essential Parts in the Drawings>

| | |
|---|---|
| 10: frame | 20: driving means |
| 30: caterpillar | 31: track of caterpillar |
| 40: probing electrode | 50: slip ring |
| 60: cable | |

BEST MODE

Hereinafter, preferred embodiments of the present invention will be described in detail with reference to the accompanying drawings.

Here, the present invention is not limited to the following embodiments but may be realized in different ways. Rather, the embodiments introduced herewith are provided to understand the spirit of the present invention to those having ordinary skill in the art such that the disclosure may become completed and perfected.

FIGS. 1 to 3 show an electrical specific resistivity probing robot according to the present invention.

The electrical specific resistivity probing robot according to the present invention includes a frame 10, a driving means 20, a pair of insulating caterpillars 30, 31, a plurality of probing electrodes installed to the caterpillars 30, a slip ring 50 electrically slip-connected to the probing electrodes 40, and a cable 60 connected to the slip ring 50.

In addition, the electrical specific resistivity probing robot according to the present invention may further include a remote control means (not shown) or a measuring means (not shown).

The electrical specific resistivity probing robot according to the present invention is configured such that a probing operator manipulates a remote controller for probing, and for example the electrical specific resistivity probing robot is configured to conduct electrical specific resistivity probing of an underground shallow region less than 2 m while traveling at most 100 m at 4 km/h.

The roller-type caterpillars 30 are installed to both sides of a lower portion of the frame 10. The caterpillars 30 should be made of insulating material. In addition, the caterpillars 30 are preferably installed to be movable in right, left, upward and downward directions and rotatable in a stationary state by means of the driving means 20. Thus, the caterpillars 30 may easily travel not only on a flat ground but also on a seriously irregular ground. The driving means 20 includes a power supply means (such as a battery) for power transmission.

A track 31 of the caterpillar 30 is preferably made of rubber material as an example, and the plurality of probing electrodes 40 are installed along the circumference of the track 31 at regular intervals. The probing electrodes 40 are preferably arranged such that at least 8 electrodes come in contact with a ground surface 70 when the caterpillar 30 contacts with the ground surface 70, as shown in FIG. 5.

The probing electrode 40 may be composed of a coupling unit 41 coupled to the tract by means of a coupling means such as bolt and nut, and an electrode tip 43 protruded from the center of the coupling unit 41, as shown in FIG. 4, as an example. In order to couple the probing electrode 40 to the tract 31, a plurality of coupling holes 42 may be formed in the coupling unit 41. The probing electrode 40 may be made of stainless steel (for example, SUS 316 3t×120×457), or other suitable metals, alloys or plated metals with excellent mechanical properties, low price, good electric conductivity, strong resistance against oxidization.

The slip ring 50 is installed to be electrically slip-connected to the probing electrodes 40 installed to each caterpillar 30 while the caterpillar 30 is traveling.

The cable 60 is electrically connected to the slip ring 50, and it is drawn above the frame 10 and then connected to a measuring means. That is to say, an electric current is applied from the measuring system to the probing electrodes 40 through the cable 60, and potential differences among the probing electrodes 40 are input to the measuring means through the cable 60, thereby allowing calculation of a three-dimensional electrical specific resistivity structure of a probing ground.

The remote controller for controlling the probing robot is configured to include a data modem, a video modem and a processor, and it is preferably provided with a case made of reinforced fiberglass that is light and strong against impact. The case of the remote controller is preferably waterproof, and a cooling fan is preferably mounted thereto such that the remote controller may be continuously used for 2 hours. In addition, the case is preferably provided with an outside approach signal port allowing data input or output and a charging port allowing recharging of a loaded battery.

Also, the electrical specific resistivity probing robot of the present invention may be directly equipped with a measuring means for receiving measured electrical specific resistivity signals and calculating an underground electrical specific resistivity structure. This measuring means receives a measurement signal through the cable 60 connected to the slip ring 50, and measures an electrical specific resistivity structure under the ground according to the received signal. Meanwhile, the measuring means may also be a separate external measuring means, which is connected to the cable.

MODE FOR INVENTION

Now, operations of the electrical specific resistivity probing robot configured as mentioned above according to the present invention will be explained.

A measuring system is loaded on the frame, and then the cable 60 is connected to the measuring system. A probing operator places the electrical specific resistivity probing robot of the present invention on the ground surface 70 of a probing ground, and then remotely controls the electrical specific resistivity probing robot using a joystick-type remote controller such that the electrical specific resistivity probing robot of the present invention travels along a probing ground path.

While the electrical specific resistivity probing robot of the present invention is traveling, an electric current is applied to the probing electrodes 40 through the cable 60 and the slip ring 50, and this electric current is applied under the ground through some probing electrodes 40 contacting with the ground along the travel of the caterpillars 30 and then flowed to other probing electrodes 40 through a current path. At this time, an iso-potential line with potential of a value obtained perpendicular to the current path is formed, and the iso-potential line is connected to the ground surface such that differences of iso-potential lines among the probing electrodes 40, namely potential differences, are measured. This data is inversely input to the measuring system. Thus, it is possible to find an accurate actual specific resistivity of a uniform underground media by using the measured potential differences and the amperage flowed to the positions of the probing electrodes 40.

In addition, if any material with different electrical specific resistivity is present under the ground, the electric current is more flowed to a material with low electrical specific resistivity, which causes variation to the iso-potential line perpendicular to the path and also gives influence on the potential difference measured at the ground surface 70. From this, it is possible to obtain an apparent electrical specific resistivity having information related to electric anomaly of the underground media by using the potential difference measured at the ground surface 70, and also it is possible to obtain a three-dimensional electrical specific resistivity structure using this data.

In the present invention, such an electrical specific resistivity structure of an underground shallow region may be continuously measured with traveling by the caterpillars 30.

The embodiments of the present invention are disclosed in the drawings and the specification. However, specific terms used herein are not intended to limit the scope of the present invention defined in the appended claims but to give better explanation of the present invention. Therefore, a person having ordinary skill in the art will understand there may be made various modifications and equivalents from the embodiments. Thus, the sincere scope of the present invention should be defined by the technical spirit of the appended claims.

INDUSTRIAL APPLICABILITY

The electrical specific resistivity probing robot according to the present invention may be utilized directly in a geophysical field, and it may be further used in the fields of resource development or underground survey.

The invention claimed is:

1. An electrical specific resistivity probing robot, comprising:
   a frame;
   a driving means including a power supply installed under the frame;
   a pair of insulating caterpillars installed to both sides of a lower portion of the frame and driven by the driving means, each of said insulating caterpillars including rollers at opposite ends of the caterpillar, a track encircling said rollers to define a track circumference, and wheels between the rollers and adjacent the track;
   a plurality of probing electrodes installed along track circumferences of the caterpillars at regular intervals;
   a slip ring continuously electrically slip-connected to the probing electrodes one by one and adapted for continuously providing electrical current to, and measuring potential differences among, the probing electrodes; and
   a cable electrically connected to the slip ring.

2. The electrical specific resistivity probing robot according to claim 1, wherein the probing electrodes are installed such that at least 8 electrodes installed along one of the track circumferences come in contact with a ground surface when the caterpillars contact with the ground surface.

3. The electrical specific resistivity probing robot according to claim 2, wherein the probing electrodes are installed such that at least 8 electrodes installed along each of the track circumferences come in contact with a ground surface when the caterpillars contact with the ground surface.

4. The electrical specific resistivity probing robot according to claim 1, further comprising a remote control means, wherein the remote control means receives a remote control signal and controls the driving means according to the received control signal.

5. The electrical specific resistivity probing robot according to claim 1, further comprising a measuring system, wherein the measuring system receives a measurement signal through the cable connected to the slip ring, and measures an electrical specific resistivity structure under the ground according to the received signal.

* * * * *